US009246771B2

(12) United States Patent
Lundgren et al.

(10) Patent No.: US 9,246,771 B2
(45) Date of Patent: Jan. 26, 2016

(54) CLOUD COMMUNICATION LAYER FOR A USER DEVICE

(75) Inventors: Lars-Gunnar Lundgren, Bjärred (SE); Erik Greisson, Malmö (SE); Linda Tolj, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/515,803

(22) PCT Filed: Jun. 20, 2011

(86) PCT No.: PCT/IB2011/052696
§ 371 (c)(1),
(2), (4) Date: Oct. 5, 2012

(87) PCT Pub. No.: WO2012/176018
PCT Pub. Date: Dec. 27, 2012

(65) Prior Publication Data
US 2014/0115480 A1    Apr. 24, 2014

(51) Int. Cl.
*H04L 12/24*  (2006.01)
*G06F 9/44*   (2006.01)
*G06F 3/0481* (2013.01)
*H04L 29/08*  (2006.01)

(52) U.S. Cl.
CPC .............. *H04L 41/22* (2013.01); *G06F 9/4443* (2013.01); *G06F 3/0481* (2013.01); *H04L 67/14* (2013.01)

(58) Field of Classification Search
CPC ............................ G06F 3/0481; G06F 9/4443
USPC ........................................................ 715/733
See application file for complete search history.

(56) References Cited

U.S. PATENT DOCUMENTS

| 2006/0277481 | A1* | 12/2006 | Forstall et al. ................ 715/764 |
| 2007/0094342 | A1  | 4/2007  | Bostick et al. |
| 2008/0215998 | A1  | 9/2008  | Moore et al. |
| 2010/0257554 | A1  | 10/2010 | Friedlander |
| 2011/0061002 | A1  | 3/2011  | Bethune et al. |
| 2012/0079119 | A1* | 3/2012  | Gill et al. ....................... 709/227 |
| 2012/0284658 | A1* | 11/2012 | Hirvonen ...................... 715/779 |

FOREIGN PATENT DOCUMENTS

WO    2009029955 A1    3/2009

OTHER PUBLICATIONS

International Search Report mailed Jan. 4, 2012 in re International application No. PCT/IB2011/052696.

* cited by examiner

*Primary Examiner* — Andrea Leggett
(74) *Attorney, Agent, or Firm* — Coats & Bennett, PLLC

(57) ABSTRACT

A Graphical User Interface (GUI) for a user device provides an interface for communicating data with nodes in a cloud computing network. The GUI has a communication layer for establishing a dedicated communications session with the cloud computing network, and a cloud interface layer that displays data and information received from the cloud computing network to the user on a display of the device. The GUI usually remains off the visible display screen, but is moved onto the visible display screen over a current user workspace responsive to detecting a first user event. The contents of the GUI may be generated dynamically based on a context of the user workspace. The GUI is moved back to its "out-of-view" position responsive to detecting a subsequent user event, and is translucent to allow the user to see the workspace through the GUI.

17 Claims, 11 Drawing Sheets

CLOUD COMMUNICATION LAYER FOR A USER DEVICE

FIELD OF THE INVENTION

The present invention relates generally to accessing resources and services provided by a cloud computing network, and more particularly to user applications and interfaces for communication devices capable of accessing those resources and services.

BACKGROUND

People currently enjoy the ability to communicate and remain relatively connected with others regardless of location. For example, many personal communication devices (e.g., Smartphones, tablet computers, etc.) allow users to make and receive voice calls with other remote parties, access the Internet, send and receive email, visit social network pages, and the like. However, the technology that facilitates these capabilities is complex and sometime problematic.

For example, each of the above-mentioned services usually has a unique user level application executing on the device. Social media applications such as FACEBOOK and TWITTER have their own applications that provide user access to that service. A user's email program would also have its own unique user-level application to provide users access to their email, as would the user's phone application. These applications are, by and large, independent of each other. Therefore, they may not communicate or share user-centric data with each other (e.g., contact lists, user IDs, passwords, etc.) unless they are integrated or specifically configured to perform those functions. Such independence can lead to many sets of the same or similar data distributed across many different devices.

Further, users can interact with different application programs, but only by ceasing interaction with one application program in favor of interacting with another. More particularly, users generally select different windows to switch between different application programs, or worse, close one application down to execute another. Such constraints are burdensome on the user, especially on devices having relatively small display screens, such as cellular telephones, for example. These problems, however, can be addressed, at least in part, with cloud computing.

Cloud computing is a term that describes "on-demand" computational resources that are available from a computer network. Such resources include, but are not limited to, hardware, computing power, software services, applications, and files. With cloud computing, a user device connected to the network (i.e., "the Cloud") can access and use different services without having the necessary hardware and/or software resident on their local device. For example, GOGGLE offers GMAIL—a cloud-based service in which the application that provides the user with access to his/her e-mail, as well as the user's information (e.g., address book, etc.), is all on-line within the computer network.

In the future, many services will be cloud-based, and will be able to share user-centric data. Thus, users will create and maintain only a single ID, password, enabler, contact list, etc., that replaces all the previous IDs, passwords, enablers, contact lists, etc. Because the data is cloud-based, users will also be able to access any of this information from any device so long as the device has a communication session established with the cloud computing network. A user interface that helps the user access these resources and services would therefore be helpful.

SUMMARY

The present invention provides a Graphical User Interface (GUI) for accessing the resources and services offered by a cloud computing network. The GUI is a dedicated interface that establishes and maintains a communications session with the cloud computing network. The GUI remains off the visible display while the user interacts with one or more application programs executing in a user workspace on a desktop. Upon detecting a first user-generated event, the GUI is overlaid onto the user workspace; however, the GUI is translucent so that the user of the device can continue to see the applications in the workspace. While the GUI is on the display, the user can interact with the cloud computing network. Upon detecting a second user-generated event, the GUI is returned its position off the visible area of the display.

Therefore, in one embodiment, the present invention provides a graphical user interface (GUI) to a cloud computing network by displaying a workspace on a display of a user device, maintaining a dedicated communications session between a graphical user interface (GUI) on the user device and the cloud computing network, and overlaying the GUI on the workspace responsive to detecting a user event at the user device.

In one embodiment, the method further comprises determining a workspace context at the user device, generating a view comprising one or more selectable widgets based on the workspace context, and wherein overlaying the GUI on the workspace comprises overlaying the view on the workspace responsive to detecting the user event.

In one embodiment, determining a workspace context at the user device comprises monitoring one or more application programs associated with the workspace, and determining the workspace context based on the monitored application programs.

In one embodiment, the method further comprises suspending execution of one or more applications associated with the workspace context while the view is visible on the workspace.

In one embodiment, the method further comprises detecting the selection of a widget by the user, retrieving information associated with the selected widget from the cloud computing network via the dedicated communications session, and displaying the retrieved information on the view for the user.

In one embodiment, the GUI comprises a communications layer and a cloud interface layer configured to send and receive data to the cloud computing network via the communications layer.

In one embodiment, the method further comprises establishing the dedicated communications session between the communications layer of the GUI and the cloud computing network.

In one embodiment, the method further comprises activating an event queue mechanism at the user device in a dedicated mode responsive to detecting the user event, and routing event messages received at the event queue mechanism to the cloud interface layer via the communications layer of the GUI.

In one embodiment, overlaying the GUI on the workspace comprises moving a translucent overlay from a "out-of-view" position in which the translucent overlay is largely or totally not visible on the display of the user device, to an "in-view"

position in which the translucent overlay is visible on the display of the user device, and returning the translucent overlay to the out-of-view position responsive to detecting another user event.

The present invention also provides a user device. In one embodiment, the user device comprises a display configured to display a user workspace, a communication interface configured to send and receive data to and from a cloud computing network, and a programmable controller. The programmable controller is configured to maintain a dedicated communications session between a graphical user interface (GUI) on the user device and the cloud computing network, and overlay the GUI on the user workspace responsive to detecting a user event at the user device.

In one embodiment, the programmable controller is further configured to determine a workspace context at the user device, generate a view to include one or more selectable widgets based on the workspace context, and overlay the view on the workspace responsive to detecting the user event.

In one embodiment, the programmable controller is configured to monitor one or more application programs associated with the workspace, and determine the workspace context based on the monitored application programs.

In one embodiment, the programmable controller is configured to suspend execution of one or more applications associated with the workspace context while the view is visible on the workspace.

In one embodiment, the programmable controller is configured to detect the selection of a selectable widget by the user, generate a message to retrieve information associated with the selected widget from the cloud computing network via the dedicated communications session, and display the retrieved information on the view for the user.

In one embodiment, the GUI comprises a communications layer configured to maintain the dedicated communications session with the cloud computing network, and a cloud interface layer configured to send and receive data to the cloud computing network via the communications layer.

In one embodiment, the programmable controller is configured to establish the dedicated communications session between the communications layer of the GUI and the cloud computing network.

In one embodiment, the programmable controller is configured to activate an event queue mechanism at the user device in a dedicated mode responsive to detecting the user event, and route event messages received at the event queue mechanism to the cloud interface layer via the communications layer of the GUI.

In one embodiment, the cloud interface layer is partitioned into a plurality of hierarchical interface layers, each interface layer comprising one or more views, and each view having one or more selectable widgets, and wherein the programmable controller is further configured to overlay a selected one of the views on the workspace responsive to detecting the user event.

In one embodiment, the programmable controller is further configured to move a translucent overlay from an "out-of-view" position in which the translucent overlay is largely or totally not visible on the display, to an "in-view" position in which the translucent overlay is visible on the display, and return the translucent overlay to the out-of-view position responsive to detecting another user event.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention provides a Graphical User Interface (GUI) for a user device configured to send and receive data to and from one or more nodes in a cloud computing network (i.e., "the Cloud"). In one embodiment, the GUI functions as a cloud interface comprising a plurality of layers executing on the user's device. One of the layers is a communication layer configured to establish and maintain a dedicated communications session with the Cloud over which the cloud interface sends and receives data to/from the Cloud. Another layer is a cloud interface layer for displaying the data and information received from the Cloud to the user on a display of the device.

The cloud interface layer itself comprises multiple levels, each of which is partitioned into one or more "views." Each view is a graphical interface that represents the manner in which the user typically "experiences" the various resources provided by the Cloud (i.e., interacts with or utilizes the resources in the Cloud). Normally, a view remains in an "out-of-view" position at a side of the device's visible display screen such that it remains largely or totally out of the viewable display area. This positioning permits the user to interact with one or more applications running in a user workspace on the desktop; however, upon detecting a user generated event, the view is overlaid onto the user workspace in an "in-view" position such that the view is within the viewable display area. While the view interface is visible on the display, the applications executing in the user workspace may be temporarily suspended. Further, an event mechanism at the user's device processes only the events that are associated with a view that is viewable on the display. Once the user returns the view to the out-of-view position, the device's event mechanism returns to processing the events and actions for the applications running in the user workspace.

Figure 1:
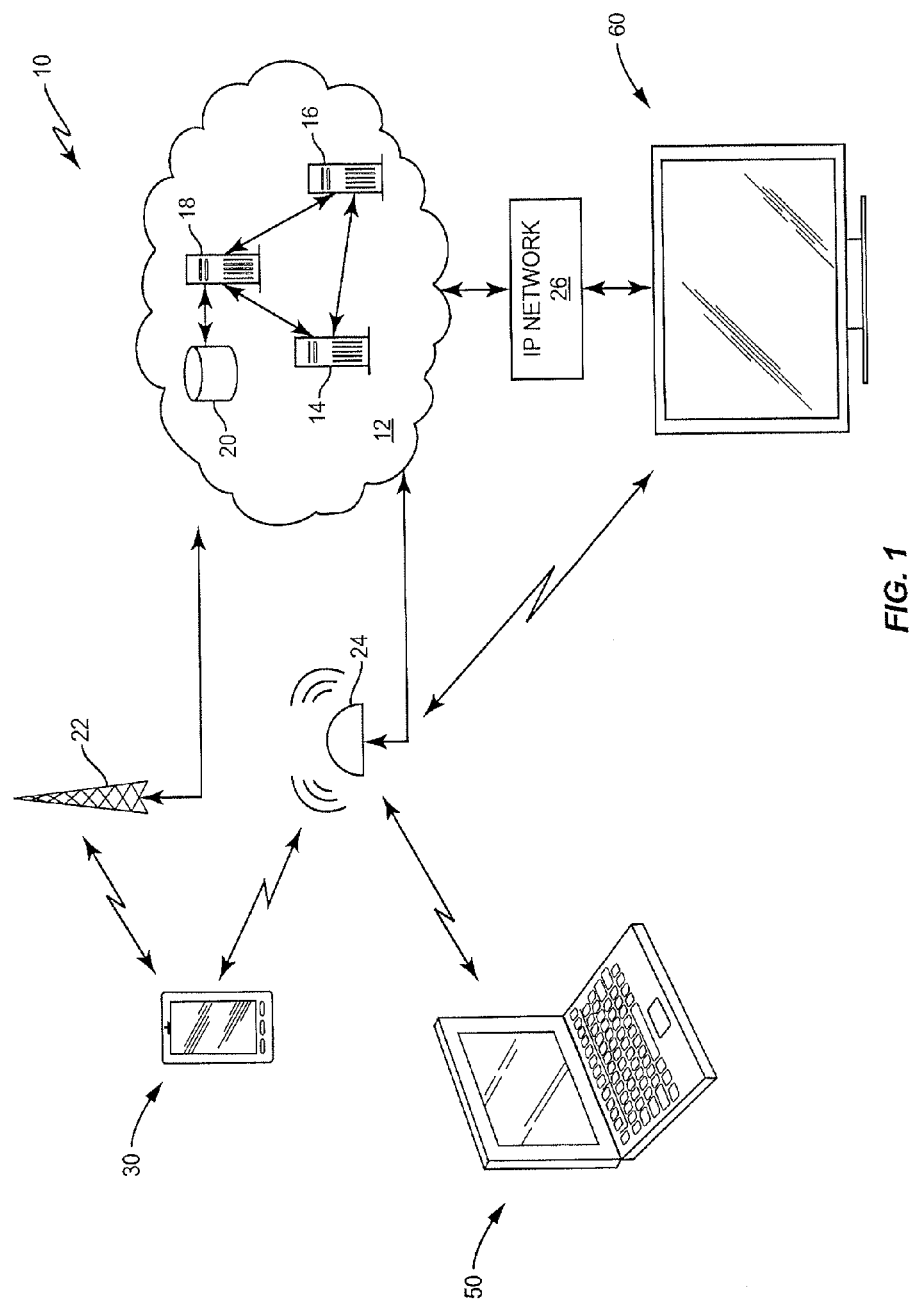
FIG. 1 is a block diagram illustrating an exemplary communications system used in one embodiment of the present invention.

Turning now to the drawings, FIG. 1 is a block diagram illustrating a communications system 10 suitable for use in one embodiment of the present invention. As seen in FIG. 1, system 10 comprises a cloud computing network (i.e., Cloud) 12 configured to communicate with one or more different user devices 30, 50, 60, via one or more access points (APs) 22, 24, 26. The Cloud 12 and the APs 22, 24, 26 are well-known in the art and not germane to the present invention. Therefore, only a brief description for these entities is contained herein.

Cloud 12 comprises a communication network having a variety of different nodes 14, 16, 18, 20. Each node 14, 16, 18, 20 operates alone, or in conjunction with one or more of the other nodes, to provide a variety of different "on-demand" computational resources for consumption by the user devices 30, 50, 60. The nodes 14, 16, 18, 20 may comprise, for example, one or more servers, gateways, databases, or other hardware entities, that avail their software and hardware resources to the user devices 30, 50, 60. With such resources, user devices 30, 50, 60 are able to perform tasks such as view and edit blogs, store, view, and communicate images, videos, and documents, interact with remote parties using a social networking application such as FACEBOOK or TWITTER, access desired web sites, send and receive email and text messages, participate in chat sessions, store and retrieve personal contact lists, and the like.

The APs 22, 24, 26 comprises the requisite hardware and software needed to communicatively link the user devices 30, 50, 60 to the Cloud 12. The APs may comprise, for example, a Radio Access Network (RAN) 22, a wireless access point (WAP) 24, or an IP network 26. The RAN 22 typically comprises one or more base stations that communicate with wireless devices, according to any known standard. Some exemplary standards include, but are not limited to, the standards known generally as the Global System for Mobile Communications (GSM), cdma2000, Universal Mobile Telecommunications System (UMTS), Wideband Code Division Multiple Access (CDMA), 3GPP Long Term Evolution (LTE), and Worldwide Interoperability for Microwave Access (WiMAX).

The WAP 24 also interconnects the user devices to the Cloud 12. Usually, the WAP 24 has a wired connection to the Cloud 12 via a router (not shown) and communicates with the various nodes (e.g., gateways) in the Cloud 12 using Transport Control Part (TCP)/Internet Protocol (IP). The WAP 24 also communicates with suitably-equipped wireless devices, such as user devices 30, 50, according to the IEEE 802.xx standards. In operation, the WAP 24 receives messages and data from the user devices 30, 50 and forwards them to the nodes 14, 16, 18. Similarly, the WAP 24 receives data from the nodes 14, 16, 18, and forwards that data wirelessly to the user devices 30, 50.

In some embodiments, a user device, such as user device 60, is not configured to communicate wirelessly with RAN 22 or WAP 24. In these cases, the user device may comprise a hardware port (e.g., an Ethernet port) configured to communicatively connect the user device to a packet data communications network 26. The network 26 may be, for example, a private IP network connected to one or more nodes of the Cloud 12. In operation, the IP network sends and receives, signaling, and other messages to and from the Cloud 12 and the user device 60.

FIGS. 2A-2D illustrate the cloud interface according to one embodiment of the present invention. For clarity and ease of discussion, the following figures describe the cloud interface in the context of a GUI executing on user device 30. However, those skilled in the art will appreciate that the following discussion could just as easily be applied to other user devices such as user devices 50 and/or 60.

Figure 2A:
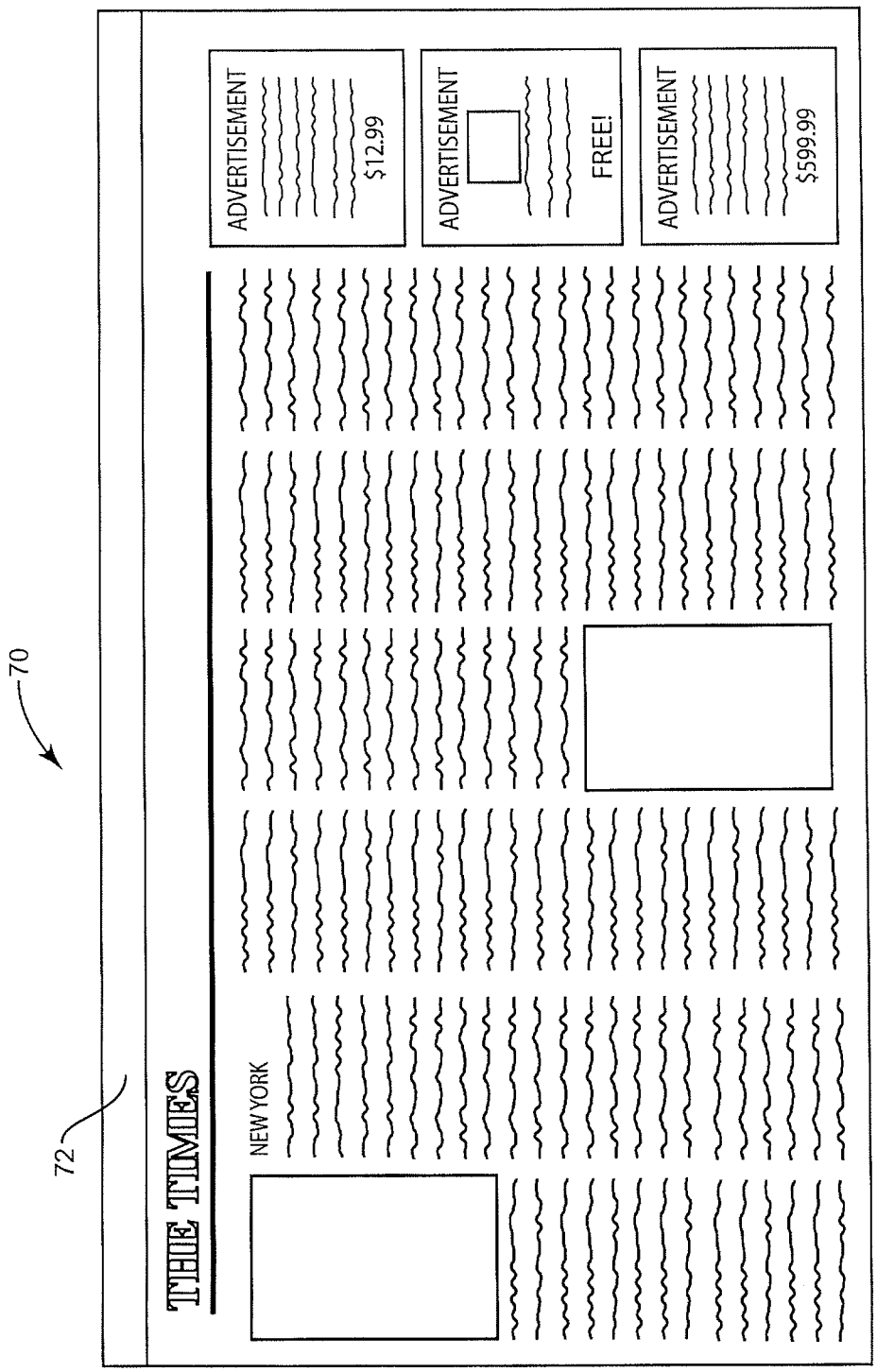
FIG. 2A is a perspective view of a user workspace displayed on a desktop of an electronic device configured according to one embodiment of the present invention.

As seen in FIG. 2A, the user device 30 displays a user workspace 70 on a desktop of a display. As is known in the art, the user workspace 70 may be used to display the interfaces of one or more application programs executing locally on the user device 30. Such application programs include, but are not limited to, game applications, user productivity applications (e.g., word processing applications and the like), and, as seen in FIG. 2A a browser application 72 that allows the user to display and interact with a variety of different web pages. According to the present invention, the user may execute one or more of these application programs on the user workspace 70 and interact with those applications, as is conventional. However, when the user wishes to communicate with one or more remote parties or remote devices via the Cloud 12, the user employs a dedicated GUI configured according to the present invention.

Figure 2B:
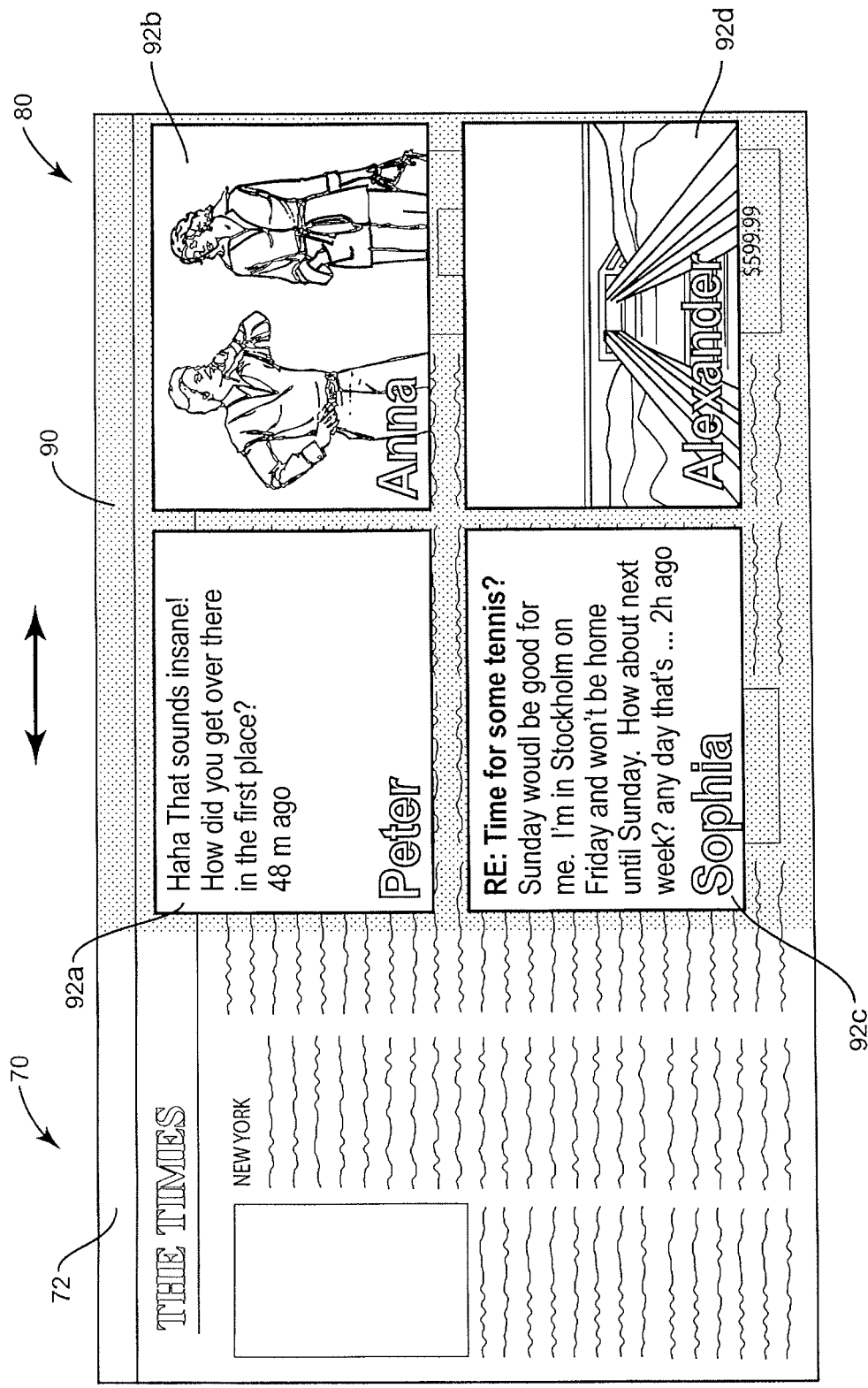
FIGS. 2B-2D are perspective views of a cloud interface of a Graphical User Interface (GUI) overlaid on top of a user workspace according to one embodiment of the present invention.

FIG. 2B illustrates a cloud interface 80 of the present invention as it might appear on a user device 30 in one embodiment. The cloud interface 80, as described in more detail later, has an established, dedicated communications session with the Cloud 12. While the user interacts with the local application(s) on user workspace 70, the cloud interface 80 is in a "out-of-view" position to a side of the display screen of user device 30. In this "out-of-view" position, the cloud interface 80 may not be visible to the user (e.g., FIG. 2A). However, when the user wishes to communicate or interact with the Cloud 12, the user performs a predetermined action to "undock" the cloud interface 80. For example, in some embodiments, the display is touch-sensitive. In these cases, the user may place one or more fingers on the display proximate the position of the out-of-view cloud interface 80, and "swipe" the fingers towards the center of the display. This action causes the cloud interface 80 to slide across the display screen from its out-of-view position into the in-view position (FIG. 2B). In this in-view position, the cloud interface 80 overlays the contents of the user workspace 70 and is visible to the user, but is translucent to allow the user to see whatever interface contents are currently displayed in the user workspace 70.

The cloud interface 80 comprises a view 90 having one or more selectable widgets 92a-92d (collectively, 92). In the in-view position, the selectable widgets 92 allow the user to interact with the Cloud 12, or with other remote users via the Cloud 12. For example, the selectable widgets 92 may comprise command buttons or other objects representing corresponding personal contacts on a touch-sensitive display. When a user selects a given widget 92 (i.e., a personal contact), the cloud interface retrieves information and data about that personal contact from the Cloud 12. The cloud interface then generates another view to display the retrieved information and data for the user.

As seen in more detail later, the views are implemented as hierarchical views. Each view provides an interactive "user experience" that reflects the way in which the user interacts with the variety of resources provided by the Cloud 12. The contents of each view may be pre-defined by the user, or as seen later in more detail, be dynamically generated based on one or more aspects deliberately monitored for by the cloud interface 80.

In this embodiment of FIGS. 2A-2D, the contents of the view are pre-defined by the user, and may be changed or altered as desired at any time. The first view 90 (e.g., FIGS. 2B-2D) of cloud interface 80 is therefore populated with selectable widgets 92a-92d to indicate personal contacts that the user may interact with on a regular basis. Such contacts may be, for example, the user's family and/or inner circle of close friends. Another widget 94, which is selectable by the user, is a text entry box that allows the user to upload or change a status on the user's personal social networking page, for example. Because the cloud interface 80 of the present invention has a dedicated communication session with the Cloud 12, selectable widgets 92 could be automatically updated with the latest information and data posted by those users when the view 90 is moved to the in-view position. Such data includes, but is not limited to, status messages, text messages, various graphics related to the location of a particular user, images, video, and the like.

Figure 2C:
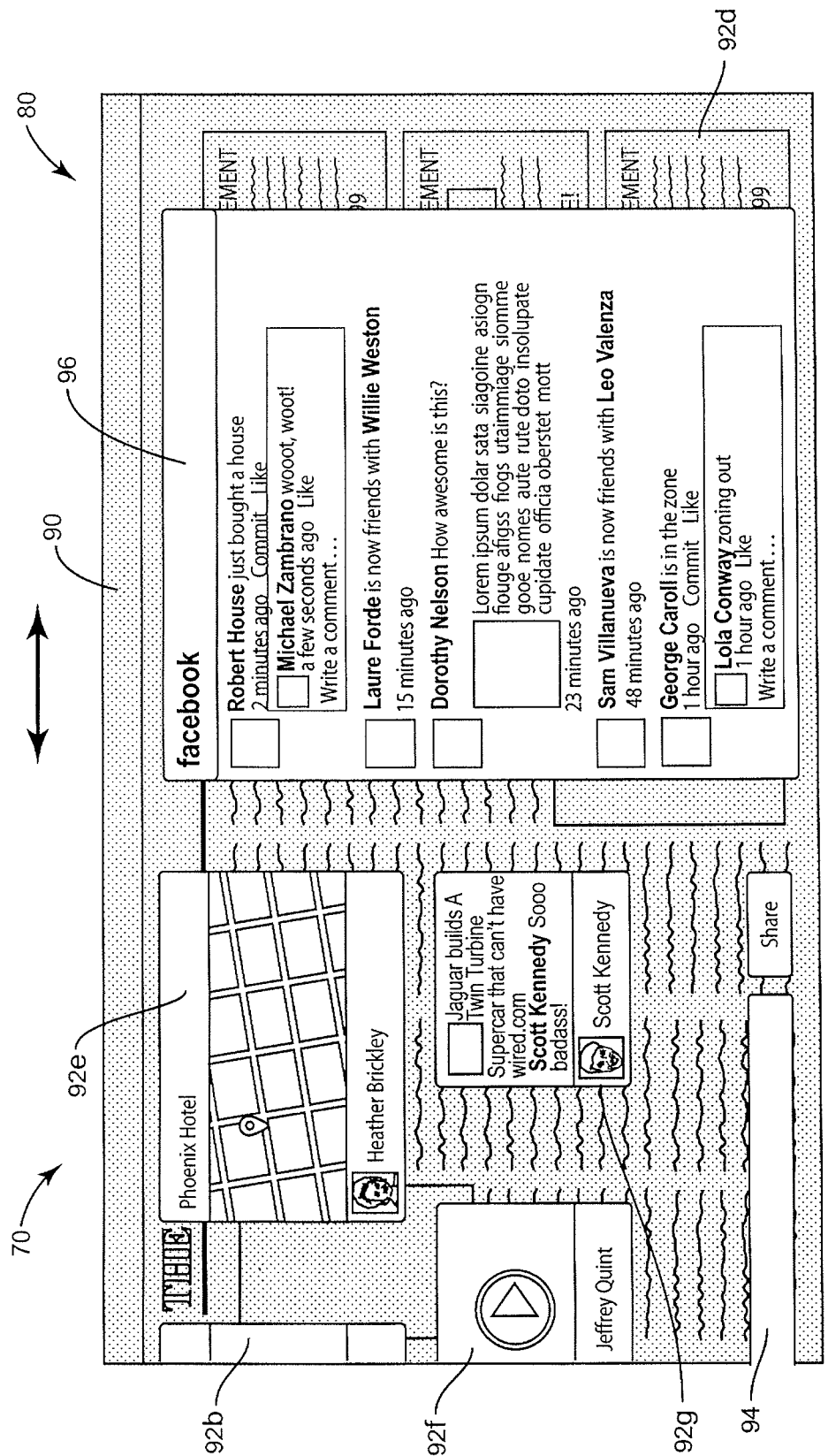
Figure 2D:
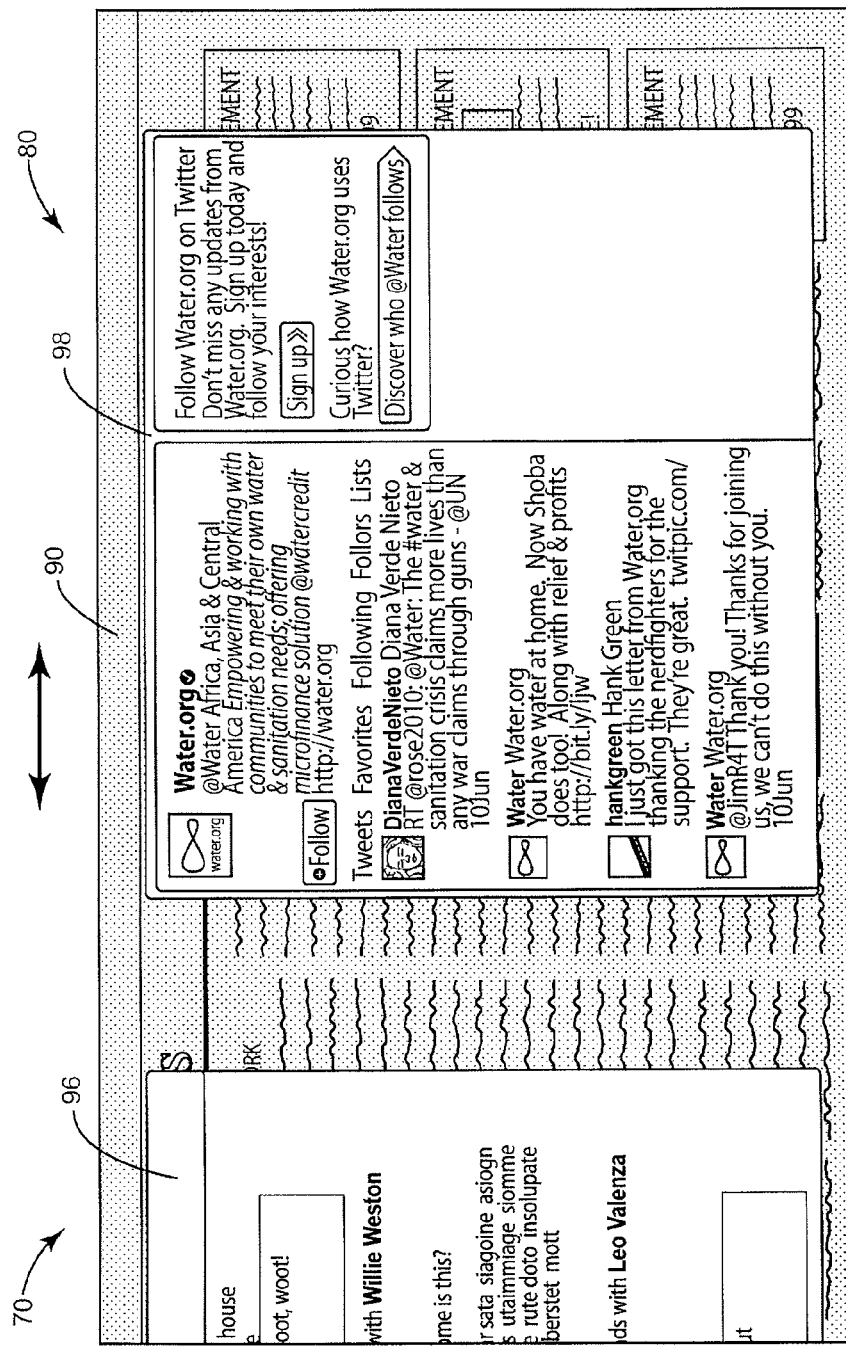

In addition to personal contacts, the first view 90 of cloud interface 80 may also comprise selectable widgets for oft used application programs or regularly visited web sites. As seen in FIGS. 2C and 2D, for example, the first view 90 may comprise selectable widgets 96 and 98 that allow the user to interact with social networking web sites such as FACE-BOOK and TWITTER, respectively. To navigate to these particular widgets 96, 98, the user would "swipe" one or more fingers across the display screen to transversally slide the view in corresponding directions. As will be appreciated by those of ordinary skill in the art, other selectable widgets may be utilized and displayed for other application programs, web sites, documents, files, or functions as needed or desired. For example, a user could have a selectable widget associated with a favorite news web site or an important document whose contents are stored in the Cloud 12. When selected by the user, the application program associated with the selected widget would launch. Because of the dedicated communication session, these additional widgets could be updated automatically with the latest information from the Cloud 12 when the user un-docks the view 90.

Figure 3:
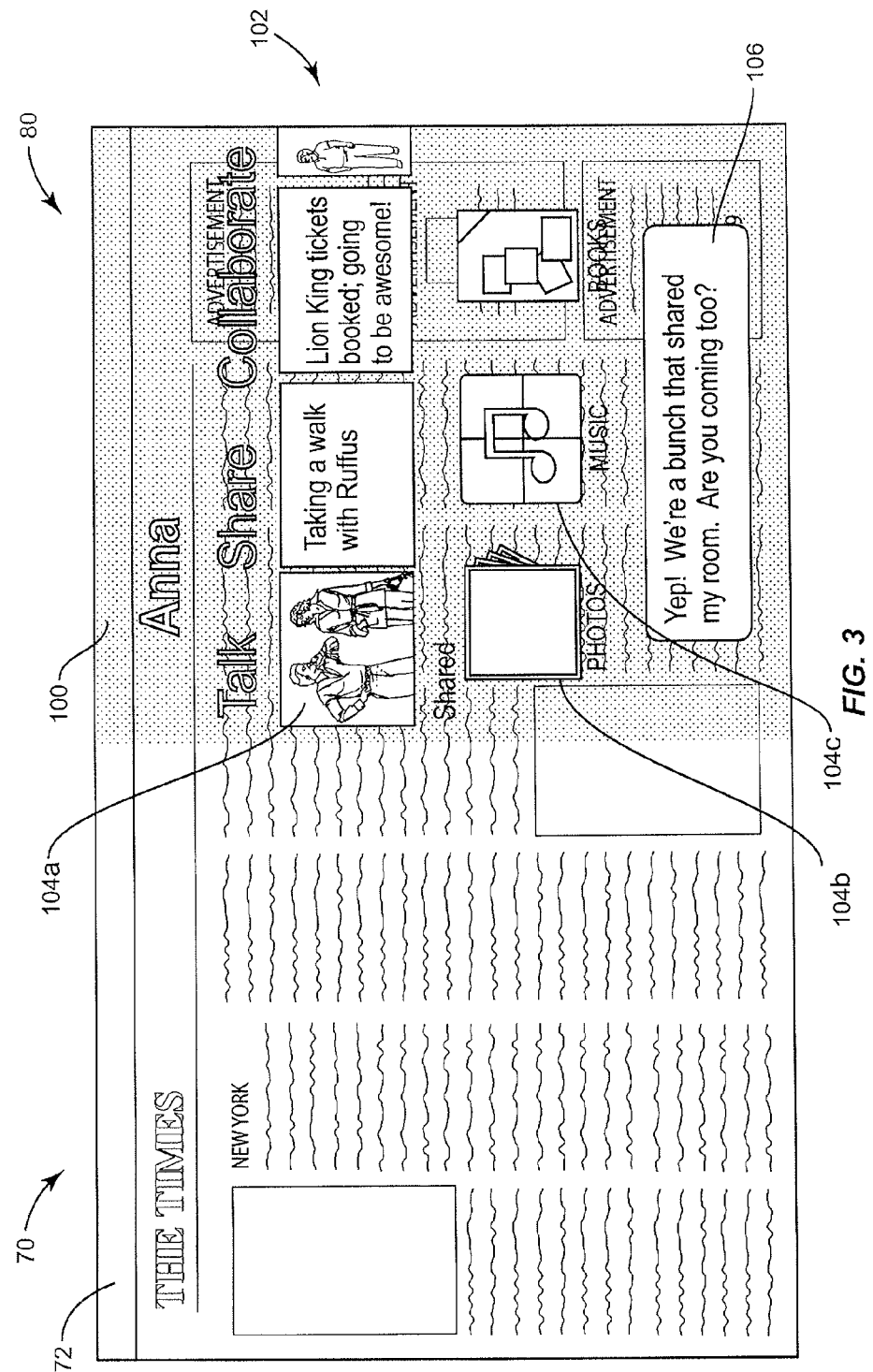
FIG. 3 is a perspective view of the GUI overlaid on top of the user workspace according to another embodiment of the present invention.

FIG. 3 illustrates a second view 100 of the cloud interface 80. In this second view 100, the selectable widgets 92, 94, 96, and 98 are replaced with selectable widgets 102, 104, and 106. Like the first view 90, this second view 100 is also overlaid onto the user workspace 70 and translucent to allow the user to see the underlying application program 72. To invoke this second view 100, the user may select one of the widgets on the first view 80. As an example, if the user were to select widget 92*b* (i.e., "Anna" from FIG. 2B), the cloud interface 80 would retrieve information associated with "Anna" from the Cloud 12 and display that information to the user in the second view 100. Such information could comprise, for example, a list of commands (e.g., "TALK," "SHARE," COLLABORATE," etc.) presented as menu options 102 that permit the user to interact with that particular person. Other data and information may comprise selectable widgets 104*a*-104*c* that allow a user to navigate to some common contact or friend, some other web site associated with "Anna". For example, widget 104*a* could link to a web site associated with "Anna," while widgets 104*b*, 104*c* could link to a shared photography or media site where Anna stores her pictures, video, or music.

In addition to the above information, the cloud interface could also retrieve address information for the selected contact. In one embodiment, the cloud interface 80 also retrieves a destination IP address for the person associated with the selected widget, and further, provides the view 80 with a text box 106. The user can utilize the text box 106 to begin a chat session, for example, with the person associated with the selected widget. More specifically, when the user enters text during the chat session and sends the messages, the cloud interface 80 could generate the appropriate messages for transmission to the destination IP address retrieved from the Cloud 12.

Figure 4:
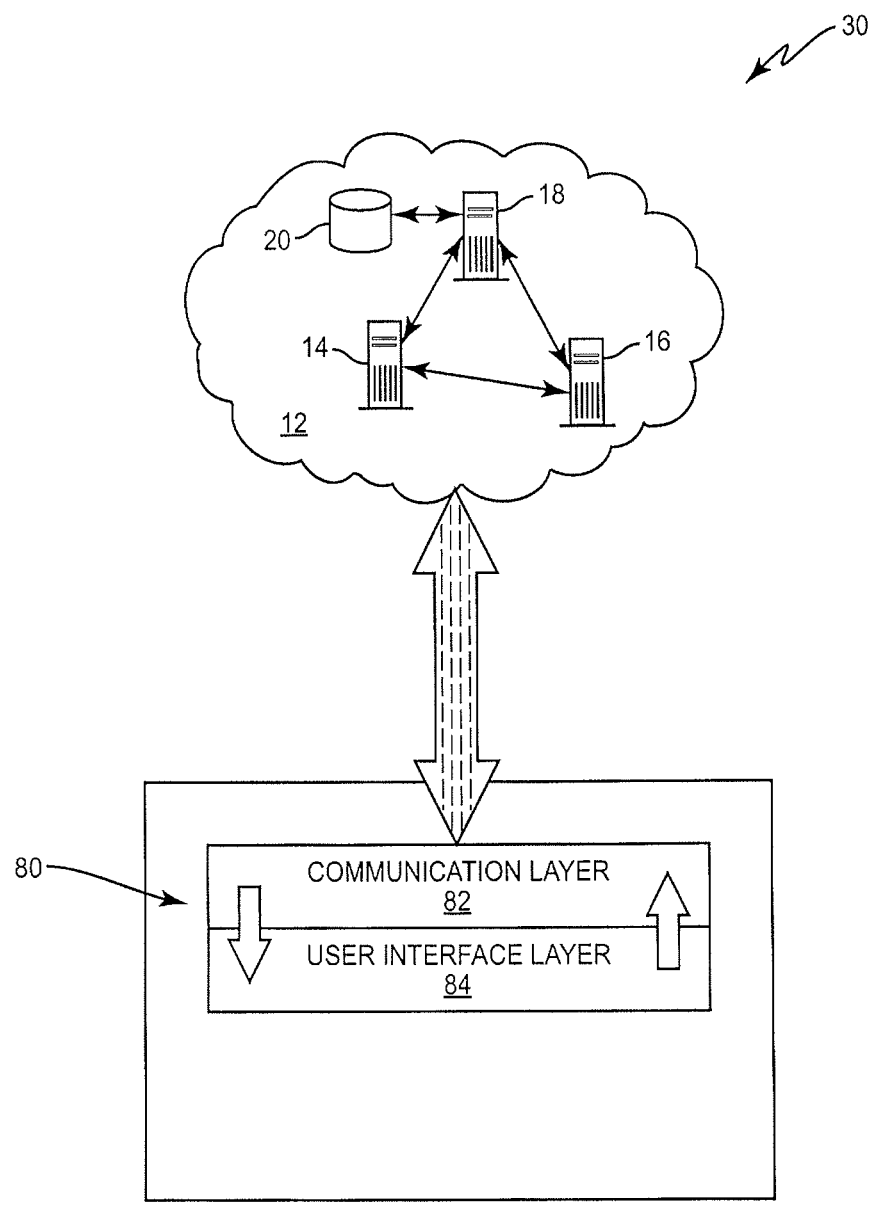
FIG. 4 is a block diagram illustrating the different layers of the GUI on a user device configured according to one embodiment of the present invention.

FIG. 4 illustrates the different layers of the cloud interface 80 and their functions. Particularly, cloud interface 80 comprises a communications interface layer 82 and a cloud interface layer 84. The communications interface layer 82 contains the logic and data required to establish and maintain a communications session with the Cloud 12. Data and information received from one or more of the nodes 14, 16, 18, 20 in the Cloud 12 is passed from the communications interface layer 82 to the cloud interface layer 84. Similarly, data and information received from the cloud interface layer 82 (i.e., one or more of the views 90,100) is passed to one or more of the nodes 14, 16, 18, 20 in Cloud 12.

Although the user device 30 may ultimately utilize a transceiver to transmit and receive data and messages, the communications interface layer 82 may include known functions and logic to enable the cloud interface 80 to communicate those messages using any known protocol (e.g., TCP/IP). Additionally, the communications interface layer 82 may include known logic functions and data to allow the user device 30 to encrypt and decrypt messages sent to/received from the nodes 14, 16, 18, 20, in the Cloud 12.

The cloud interface layer 84, as previously described, provides the user with the interactive, input/output interface that may be partitioned into multiple, hierarchical views 90, 100. The cloud interface layer 84 may generate the views automatically based on user input, or dynamically based on the context of the user workspace 70, as will be discussed below. In one embodiment of the present invention, the cloud interface layer 84 also includes logic and data for monitoring the applications currently on the user workspace 70 when the user invokes the cloud interface 80. As seen in more detail later, this information may be used to dynamically generate specific selectable widgets on the views 90, 100.

Figure 5A:
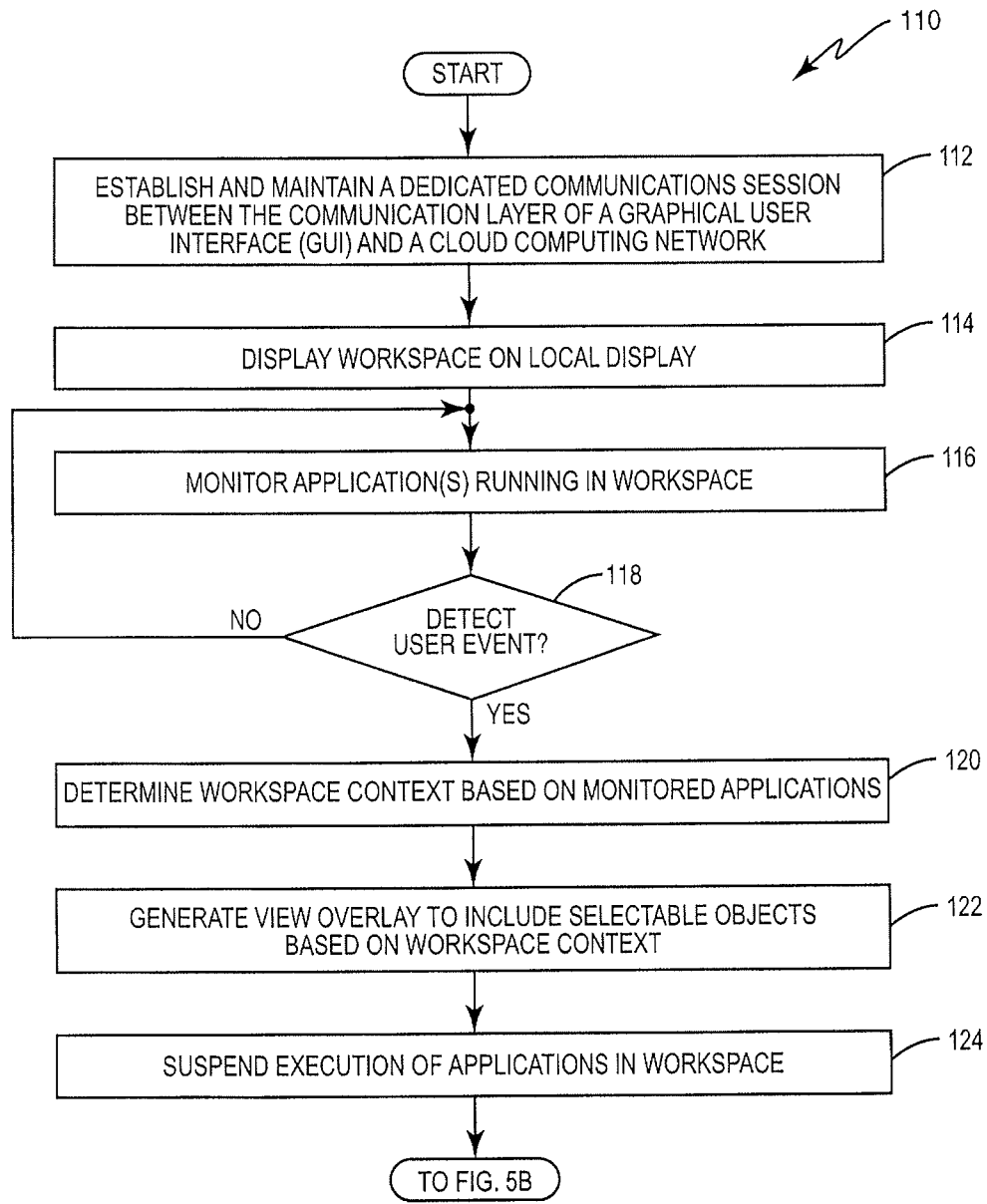
FIGS. 5A-5B are flow diagrams illustrating a method of providing access to a cloud computing network from a user device configured according to one embodiment of the present invention.
Figure 5B:
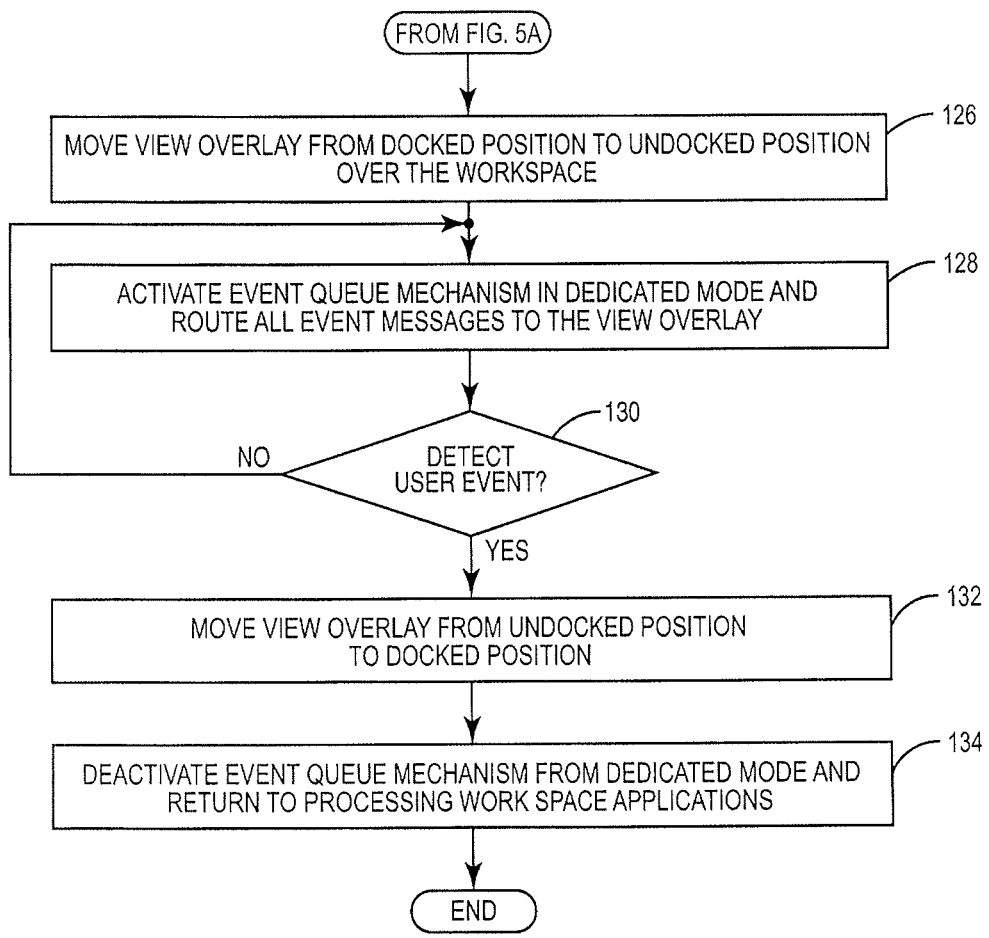

FIG. 5 is a flow diagram illustrating a method 110 of providing access to the resources provided by the Cloud 12 according to one embodiment of the present invention. Method 110 begins with the communication interface layer 82 establishing and maintaining a dedicated communication session with the Cloud 12 (box 112). The session may be established, for example, upon the cloud interface 80. The user device 30 also displays the application program interfaces (e.g., browser application 72 from FIG. 2A) in the user workspace 70 (box 114). While the user interacts with the applications running in the user workspace 70, the cloud interface layer 84 monitors that interaction in the background to determine a context of the user workspace 70 (box 116).

The user device 30 allows the user to continue interacting with the applications in the user workspace 70. However, upon detecting a user action such as a "swipe" across the display of user device 30 (box 118), the cloud interface layer 84 determines the context of the user workspace 70 (box 120). For example, the cloud interface layer 84 may determine that the user is currently viewing a specific web page or playing a certain game. Based on that information (i.e., the workspace context), the cloud interface layer 84 dynamically generates a view to include one or more selectable widgets that are appropriate for the workspace context (box 122). By way of example, if the user was playing a specific game when the cloud interface 80 was invoked, the cloud interface layer 84 could access the Cloud 12 via the dedicated communication session to determine people and/or websites associated with that game. Then, based on that information, the cloud interface 80 would generate a view to include selectable widgets for people and web sites associated with that game.

As previously stated, the applications executing in the user workspace may be temporarily suspended while the view interface is visible on the display. Therefore, in one embodiment, the cloud interface layer 84 generates the commands necessary to temporarily suspend the execution of the application programs running in the user workspace 70 (box 124) and move the generated view 90 from the out-of-view position into the in-view position, as previously described (box 126). In embodiments wherein the applications executing in the user workspace are not temporarily suspended, the cloud interface layer 84 would simply move the generated view 90 from the out-of-view position into the in-view position, as previously described (box 126). Regardless of whether the applications executing in the workspace context are/are not suspended, the cloud interface layer 84 would generate the requisite commands to cause an event mechanism in the user device 30 to begin operating in a dedicated mode (box 128). Generally, as is known in the art, an event mechanism for a device sends received messages to a particular program executing on the device. In this dedicated mode, the user device event mechanism would cease routing messages from the event queue of the device to the applications in the workspace 70, and instead, route all event messages associated with the view 90 to the cloud interface layer 84.

The user then interacts with the Cloud 12 using the view 90 until the cloud interface 80 detects another user action, such as another user "swipe" across the display screen in the opposite direction (box 130). Upon detecting this action, the user device 30 moves the view 90 of the cloud interface back into the in-view position (box 132), deactivates the event mechanism from the dedicated mode, and returns the user device 30 to processing the workspace applications (box 134).

Figure 6:
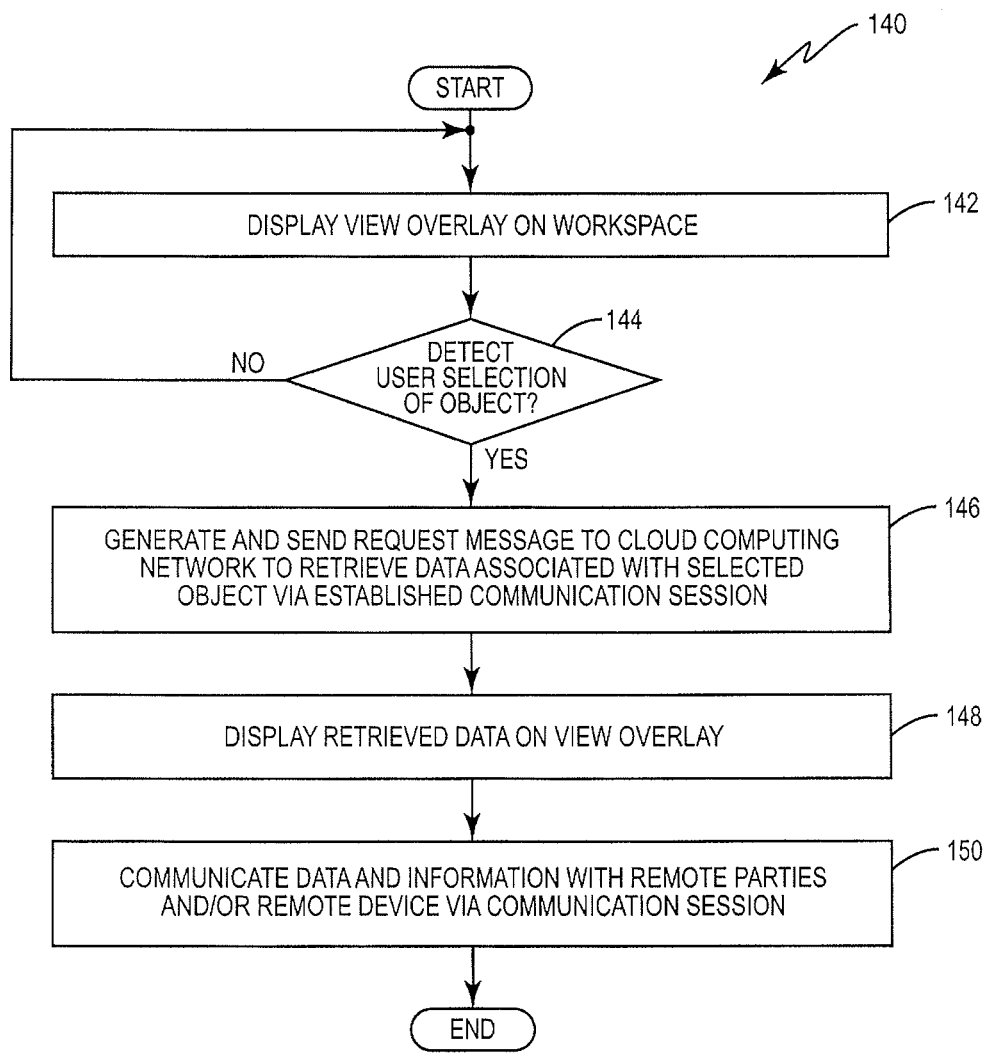
FIG. 6 is a flow diagram illustrating a method of retrieving information associated with a personal contact from the cloud computing network, and displaying that information on the cloud interface of the GUI according to one embodiment of the present invention.

FIG. 6 is a flow diagram illustrating a method 140 of invoking and displaying the second view 100. Method 140 begins with the view 90 displayed for the user (box 142). As stated previously, the view 90 is the first hierarchical level of the cloud interface 80, and is overlaid on top of the user workspace 70 responsive to detecting a user "swipe" action across the display screen. The view 90 permits the user to continue interacting with the Cloud 12; however, when the cloud interface layer 82 detects that the user has selected a particular widget 92 (box 144), the cloud interface layer 82 replaces view 90 with the view 100. Particularly, the cloud interface layer 92 determines which widget the user selected, and then generates and sends a request message to the Cloud 12. The request message is a query to the Cloud 12 to retrieve information and data associated with the selected widget (box 146). Such information includes, but is not limited to, personal contact information, shared videos and images, social network pages, and the like. Once the cloud interface receives the information from the Cloud 12, the cloud interface generates the view 100 to contain the received information and data (box 148) (see e.g., FIG. 3). Via the view 100, the user can view the personal contact information, open a chat session, view shared photos, communicate with shared friends, and the like, as previously described (box 150).

Figure 7:
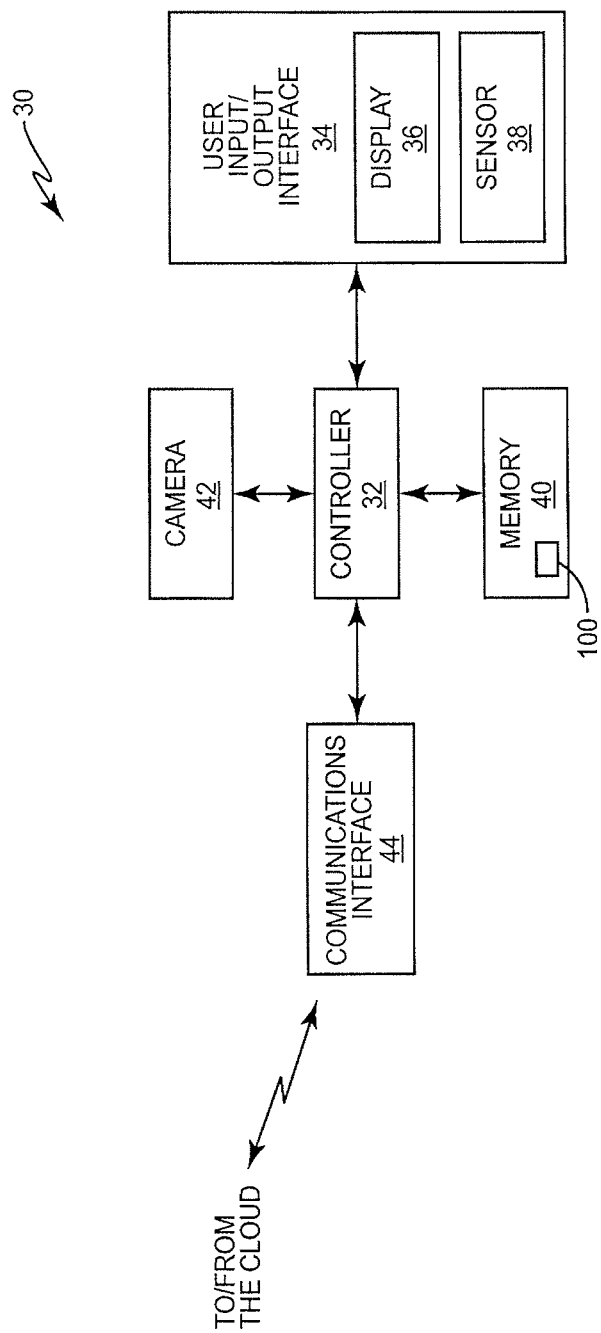
FIG. 7 is a block diagram illustrating some of the component parts of a user device configured according to one embodiment of the present invention.

FIG. 7 is a block diagram illustrating a user device 30 configured to perform the present invention according to one or more embodiments. As those skilled in the art will appreciate, the components seen in FIG. 7 may also be used in other user devices, such as user devices 50, 70.

In one embodiment, user device 30 comprises a programmable controller 32, a user input/output interface 34 having a display 36 and a sensor device 38, a memory 40, a camera 42, and a communications interface 44. Controller 32 controls the operation of the user device 30 according to programs and data stored in memory 40. The control functions may be implemented, for example, in a single microprocessor, or in multiple microprocessors. Suitable microprocessors may include general purpose and special purpose microprocessors, as well as digital signal processors. Controller 32 may interface with an audio processing circuit (not shown), as is known in the art, to provide basic analog output signals to a speaker (not shown) and receive analog audio inputs from a microphone (not shown). In one embodiment, controller 32 is configured to perform the present invention as previously described according to the logic that comprises the cloud interface 80. Particularly, when executed by the controller 32, the cloud interface 80 configures the controller 32 to send and receive data to and from the Cloud 12, and to display different views (e.g., views 90, 100) based on detecting predefined user events. In one embodiment, the cloud interface 80 also configures the controller 32 to monitor the applications that run in the user workspace 70, and to dynamically populate the view(s) based on a determined workspace context, as previously described.

User I/O interface 34 provides a user with the necessary components to interact with the user device 30, and includes a display 36 and a sensor device 38. Although not specifically shown in FIG. 7, those of ordinary skill in the art will appreciate that the user I/O interface 34 may also comprise such well-known components as a keypad, a microphone, and a speaker. The display 36 permits users to view dialed digits, call status, menu options, and service information typically associated with wireless communications.

In one embodiment, display 36 comprises a touch-sensitive display that generates the signals needed to control the movement of the cloud interface 80 between the out-of-view and in-view positions. To move the view to the "in-view" position, a user could touch the display at a position that is proximate the out-of-view cloud interface 80 with one or more fingers and swipe them across the display 36. The "swiping" action of the user would then generate a "swipe in" event message that the controller 32 receives from the device's event mechanism. Upon receipt of the "swipe in" event message, the controller 32 may generate the necessary control signals to suspend the applications currently running in the user workspace 70, and slide the view onto the user workspace 70. A "swiping" action across the display 36 in the opposite direction would generate a "swipe out" event for controller 32. Upon receipt of the "swipe out" event, the controller 32 would generate the appropriate control signals to move the overlay to the out-of-view position and resume processing the applications running in the workspace 70.

Those skilled in the art will appreciate that a touch-sensitive display screen is not required to move the views into and out of the in-view position. This is beneficial because not all displays are touch-sensitive. Therefore, in other embodiments, the user device 30 includes a sensor 38 that detects user movement. Sensor 38 may be, for example, an optical sensor that detects changes in ambient light caused by the user passing a hand over the sensor. Other sensors may also be used, such as those that detect heat or touch. In one embodiment, the sensor 38 may be a key on a keypad or some other control button disposed on a housing of the user device 30.

In one embodiment, the user device 30 is equipped with a camera 42. In these cases, the camera 42 may be utilized to capture an image of the user "swiping" a hand or finger(s) through the air above the display 36. Utilizing known software techniques, the user device 30 could analyze the captured images to determine whether the user is moving the view to the in-view position or the out-of-view position. Particularly, the circuitry associated with the camera 42 could generate "swipe in" and "swipe out" events based on the image analysis. The controller 32 could then interpret these events to move the view into and out of the in-view position, as previously described.

In FIG. 7, the communications interface 44 is embodied as a long-range transceiver for transmitting and receiving data to and from the Cloud 12 via one or more base stations 22 in a wireless communications network. Thus, the communications interface 44 may, in one embodiment, comprise a fully functional cellular radio transceiver that operates according to any known standard. Such standards include, but are not limited to, the Global System for Mobile Communications (GSM), TIA/EIA-136, cdmaOne, cdma2000, UMTS, and Wideband CDMA. Alternatively, however, the communications interface 44 may comprise a short-range transceiver operating according to Wi-Fi standards, BLUETOOTH standards, or any standard associated with the IEEE 802.xx family of standards, or an Ethernet interface. Regardless of the specific communications standard, however, the communication interface layer 82 receives messages from the cloud interface layer 84 for transmission to the Cloud 12. The communication interface layer 82 also receives messages from the Cloud 12 and passes those messages to the cloud interface layer 84.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method of providing a graphical user interface (GUI) to a cloud computing network, the method performed at a user device and comprising:
   displaying, by the user device, a user workspace on a display of a user device;
   maintaining, by the user device, a dedicated communications session between a graphical user interface (GUI) on the user device and the cloud computing network;
   determining, by the user device, a current workspace context of the user device, wherein the current workspace context is defined by one or more application programs executing within the user workspace;
   generating, by the user device, a view comprising one or more selectable widgets based on the current workspace context; and
   overlaying, by the user device, the GUI on the user workspace responsive to detecting a user event at the user device, wherein overlaying the GUI on the user workspace comprises overlaying the view on the user workspace responsive to detecting the user event.

2. The method of claim 1 wherein determining, by the user device, a current workspace context of the user device comprises:
   monitoring the one or more application programs executing within the user workspace; and
   determining the current workspace context based on the monitored one or more application programs.

3. The method of claim 1 further comprising suspending execution of the one or more application programs executing within the user workspace while the view is visible on the user workspace.

4. The method of claim 1 further comprising:
   detecting, by the user device, the selection of a widget by the user;
   retrieving, by the user device, information associated with the selected widget from the cloud computing network via the dedicated communications session; and
   displaying, by the user device, the retrieved information on the view for the user.

5. The method of claim 1 wherein the GUI comprises a communications layer and a cloud interface layer configured to send and receive data to the cloud computing network via the communications layer.

6. The method of claim 5 further comprising establishing the dedicated communications session between the communications layer of the GUI and the cloud computing network.

7. The method of claim 5 further comprising:
   activating, by the user device, an event queue mechanism at the user device in a dedicated mode responsive to detecting the user event; and
   routing, by the user device, event messages received at the event queue mechanism to the cloud interface layer via the communications layer of the GUI.

8. The method of claim 1 wherein overlaying, by the user device, the GUI on the workspace comprises:
   moving a translucent overlay from an out-of-view position in which the translucent overlay is not visible on the display of the user device, to an in-view position in which the translucent overlay is visible on the display of the user device; and
   returning the translucent overlay to the out-of-view position responsive to detecting another user event.

9. A user device comprising:
   a display device configured to display a user workspace;
   a communication interface configured to send and receive data to and from a cloud computing network; and
   a programmable controller circuit configured to:
      maintain a dedicated communications session between a graphical user interface (GUI) on the user device and the cloud computing network;
      determine a current workspace context of the user device, wherein the current workspace context is defined by one or more application programs executing within the user workspace;
      generate a view to include one or more selectable widgets based on the current workspace context; and
      overlay the view on the user workspace responsive to detecting a user event at the user device.

10. The device of claim 9 wherein the programmable controller circuit is configured to:
    monitor the one or more application programs executing within the user workspace; and
    determine the current workspace context based on the monitored application programs.

11. The device of claim 9 wherein the programmable controller circuit is configured to suspend execution of the one or more application programs executing within the user workspace while the view is visible on the user workspace.

12. The device of claim 9 wherein the programmable controller circuit is configured to:
    detect the selection of a widget by the user;
    generate a message to retrieve information associated with the selected widget from the cloud computing network via the dedicated communications session; and
    display the retrieved information on the view for the user.

13. The device of claim 9 wherein the GUI comprises:
    a communications layer configured to maintain the dedicated communications session with the cloud computing network, and
    a cloud interface layer configured to send and receive data to the cloud computing network via the communications layer.

14. The device of claim 13 wherein the programmable controller circuit is configured to establish the dedicated communications session between the communications layer of the GUI and the cloud computing network.

15. The device of claim 13 wherein the programmable controller circuit is configured to:
   activate an event queue mechanism at the user device in a dedicated mode responsive to detecting the user event; and
   route event messages received at the event queue mechanism to the cloud interface layer via the communications layer of the GUI.

16. The device of claim 13 wherein the cloud interface layer is partitioned into a plurality of hierarchical interface layers, each interface layer comprising one or more views, and each view having one or more selectable widgets, and wherein the programmable controller circuit is further configured to overlay a selected one of the views on the user workspace responsive to detecting the user event.

17. The device of claim 9 wherein the programmable controller circuit is further configured to:
   move a translucent overlay from an out-of-view position in which the translucent overlay is not visible on the display device, to an in-view position in which the translucent overlay is visible on the display device; and
   return the translucent overlay to the out-of-view position responsive to detecting another user event.

* * * * *